US011002600B2

(12) United States Patent
Jasper et al.

(10) Patent No.: US 11,002,600 B2
(45) Date of Patent: May 11, 2021

(54) DETECTOR PROTECTION IN AN OPTICAL EMISSION SPEEDOMETER

(71) Applicant: Thermo Fisher Scientific (Bremen) GmbH, Bremen (DE)

(72) Inventors: Eike Jasper, Stuhr (DE); Ruan Hattingh, La Jolla, CA (US); Sebastian Geisler, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 33 days.

(21) Appl. No.: 16/154,168

(22) Filed: Oct. 8, 2018

(65) Prior Publication Data

US 2019/0107437 A1 Apr. 11, 2019

(30) Foreign Application Priority Data

Oct. 9, 2017 (GB) .................................. 1716478

(51) Int. Cl.
| | | |
|---|---|---|
| *G01J 3/26* | (2006.01) | |
| *G01J 3/02* | (2006.01) | |
| *G01N 21/15* | (2006.01) | |
| *G01N 21/73* | (2006.01) | |
| *H01J 49/00* | (2006.01) | |
| *H01J 49/02* | (2006.01) | |

(52) U.S. Cl.
CPC .......... *G01J 3/0275* (2013.01); *G01N 21/15* (2013.01); *G01N 21/73* (2013.01); *H01J 49/0031* (2013.01); *H01J 49/022* (2013.01)

(58) Field of Classification Search
CPC .... G01J 3/10; G01J 3/2823; G01J 3/02; G01J 3/28; G01J 3/2803

USPC ........................................................ 356/326
See application file for complete search history.

(56) References Cited

U.S. PATENT DOCUMENTS

| | | |
|---|---|---|
| 5,879,626 A | 3/1999 | Watterson |
| 6,919,279 B1 | 7/2005 | Rulkens et al. |
| 2008/0212074 A1* | 9/2008 | Goulter ................... G01J 3/36 356/51 |

(Continued)

FOREIGN PATENT DOCUMENTS

| | | |
|---|---|---|
| EP | 0159157 A1 | 10/1985 |
| JP | 0224536 A | 1/1990 |

(Continued)

OTHER PUBLICATIONS

First Office Action dated Nov. 4, 2020, to CN Patent Application No. 20181172677.8.

*Primary Examiner* — Md M Rahman (57) ABSTRACT

A protection device for an Optical Emission Spectrometer (OES) and a method of protecting a detector to which purge gas is supplied, in an OES, are disclosed. The protection device comprises a timer, which measures a parameter, such as a humidity value, indicative of a shut down time period following cessation of application of purge gas to the detector. The protection device comprises a processor, which determines a start-up time period, based on the parameter, during which purge gas is supplied to the detector prior to cooling of the detector. The processor may selectively trigger commencing or maintaining application of purge gas to the detector or cooling of the detector in dependence on the parameter.

12 Claims, 9 Drawing Sheets

(56) References Cited

U.S. PATENT DOCUMENTS

2014/0216153 A1* 8/2014 Pion .................... G01N 27/225
                                                    73/335.04
2017/0173771 A1* 6/2017 Grandjean ............... B25C 1/08

FOREIGN PATENT DOCUMENTS

| JP | 2004357109 A | 12/2004 |
| JP | 2007003320 A | 1/2007 |

\* cited by examiner

DETECTOR PROTECTION IN AN OPTICAL EMISSION SPEEDOMETER

CROSS-REFERENCE TO RELATED APPLICATION

This application claims the priority benefit under 35 U.S.C. § 119 to British Patent Application No. 1716478.1, filed on Oct. 9, 2017, the disclosure of which is incorporated herein by reference.

FIELD OF THE INVENTION

This invention relates to devices and methods for protecting the detector in an optical emission spectrometer (OES) such as an Inductively Coupled Plasma Optical Emission Spectrometer (ICP-OES), Spark Ablation OES, Microwave Induced Plasma (MIP) OES, or the like.

BACKGROUND TO THE INVENTION

Inductively Coupled Plasma Optical Emission Spectrometry is an elemental analysis technique that derives its analytical data from the emission spectra of elements excited within a high temperature plasma. The purpose of the optical system in an ICP-OES is to separate element specific wavelengths of light that are emitted from the excited sample, and to focus the resolved light onto a detector as efficiently as possible.

The ICP-OES is comprised of five sections: a sample introduction region, a torch, a focusing optics region, a wavelength separation device (polychromator) and a detector. Light exiting the polychromator is focused onto the detector.

Traditionally, optical detection was carried out using a photomultiplier tube. Solid state charge transfer devices (CTDs) have replaced these in recent times. Charge transfer devices can be grouped broadly into two categories: Charge Injection Devices (CIDs) and Charge Coupled Devices (CCDs). Each is comprised of a doped silicon wafer forming a 2D pixel array. CIDs offer significant benefits in the field of atomic spectroscopy, when compared with other CTDs.

The detector in an OES is desirably capable of detecting light across a wide range of wavelengths in the visible and ultraviolet parts of the spectrum. For example, the iCap 7000 Plus Series ICP-OES supplied by Thermo Fisher Scientific, Inc offers virtually continuous wavelength coverage across a range of 166.4 nm to 847.0 nm.

CID detectors require cooling to temperatures below zero Celsius—typically, −40 to −45 degrees Celsius—to achieve best performance. Cooling reduces the amount of dark current/noise. Moreover, CID detectors are purged with an inert gas such as argon or nitrogen that contains little or no water (around or less than 10 parts per million (10 ppm) of water). Such dry inert gas purging optimises transmission of light having a wavelength below around 190 nm.

If the CID detector is not purged, over time relatively moist air can leak into the detector chamber. Additionally or alternatively, the detector chamber may be purged with gas containing residual water, such as may happen if, for example, poorer quality purge gases such as welding argon are employed.

In either case, upon cooling the detector to its preferred sub-zero operating temperature, any water present will freeze on the detector surface. Reduced detector performance then occurs in the region of the frozen water and, in worst cases, the frozen water can irreparably damage the detector such that it must be replaced. Furthermore, the frozen water may reduce light transmission through the detector.

The present invention seeks to address this problem.

SUMMARY OF THE INVENTION

A first aspect of the present invention is defined by claim 1. A second aspect is defined by claim 13. A first method according to the present invention is defined by claim 16. A second method according to the present invention is defined by claim 21.

The purge gas is preferably a dry purge gas, i.e. a gas that is substantially free of water vapour. Examples include argon or dry nitrogen. By monitoring a time since purge gas was supplied to the detector of the OES following shut down (for example, by determining an amount of time from power down of the spectrometer, which typically causes stopping of a supply of purge gas to the detector, or by measuring a length of time following shut off of the purge gas to the detector through, for example, operation of a valve), an informed decision can be taken over the amount of time necessary to purge the detector again when a start-up procedure commences. In other words, the purging time on restart is not fixed but instead is a variable time that depends upon the length of time since shut down of purging. Alternatively or in addition, moisture content within the detector may be measured using a humidity sensor following stopping of a supply of purge gas to the detector. By measuring the moisture content, an informed decision can be taken over whether the detector may be cooled safely and/or the amount of time necessary to purge the detector before cooling of the detector. Therefore, the purging time on restart of application of purge gas to the detector is a variable time that may depend upon the moisture content within the detector.

In general quantitative terms, the longer the detector has not been purged, the longer it is necessary to purge it when restarting. Software (for example) in the protection device, preferably that is run or executed on the processor, can determine the time needed to purge the detector in order to have confidence that the atmosphere surrounding the detector is sufficiently water vapour free that cooling of the detector will avoid damage to it and/or avoid a reduction of its performance. On the other hand, measurement of the time since cessation of the supply of purge gas to the detector and/or measurement of moisture content in the detector following cessation of the supply of purge gas to the detector allows purging to take place upon restart for a period no longer than necessary. This in turn results in a shorter time before the OES is ready to use again and a consequential reduction in the volume of purge gas needed.

Further advantages of the invention will be apparent from the appended dependent claims.

BRIEF DESCRIPTION OF THE DRAWINGS

The invention may be put into practice in a number of ways and some specific embodiments will now be described by way of example only and with reference to the accompanying drawings in which.

DETAILED DESCRIPTION OF PREFERRED EMBODIMENTS

Figure 1:
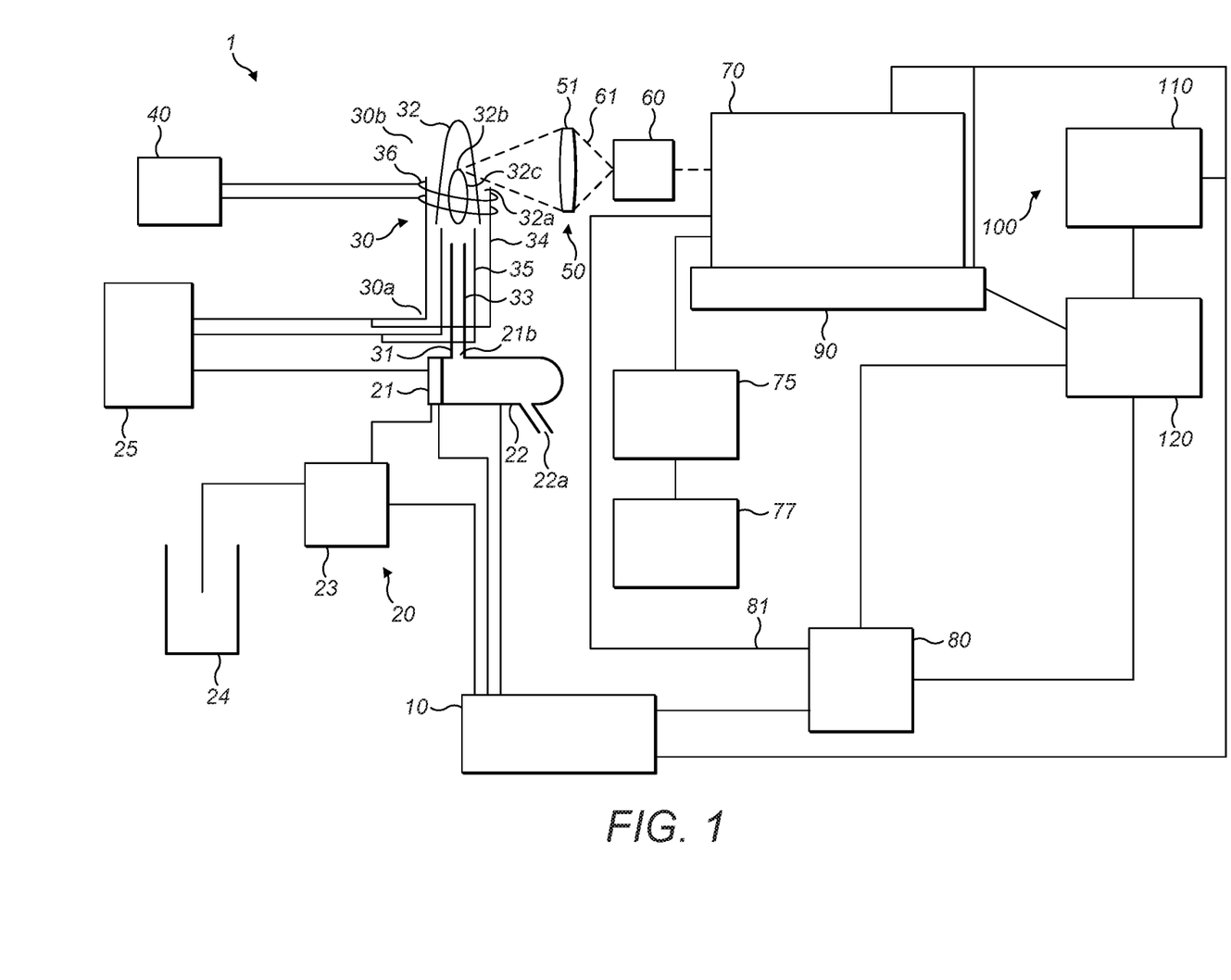
FIG. 1 is a schematic diagram of a first embodiment of an inductively coupled plasma optical emission spectrometer (ICP-OES) with a timer and a processor in accordance with the present invention.

FIG. 1 shows a schematic diagram of an ICP-OES 1 according to an embodiment of the present invention. The ICP-OES 1 comprises a power supply 10, a sample introduction region 20, an ICP torch 30 powered by a radio-frequency generator 40, focusing optics region 50, a wavelength selection device 60, a detector 70, a purge gas supply 80, a cooling device 90, and a protection device 100 comprising a timer 110 and a processor 120.

The sample introduction region 20 comprises a nebulizer 21, a spray chamber 22 and a peristaltic pump 23 powered by the power supply 10. A liquid sample is extracted from a sample source 24 and supplied to the nebulizer 21 by the peristaltic pump 23. The nebulizer 21 contains an inert gas, typically argon, provided by the inert gas supply 25] to which it is connected. The nebulizer 21 is employed to nebulize the liquid sample into a stream of droplets (sample aerosol) and may, for example, be of the pneumatic, ultrasonic or grid type. Whilst FIG. 1 shows the inert gas supply 25 and the purge gas supply 80 to be in two separate locations, the skilled person would understand that the inert gas supply 25 may be located within the same gas box as the purge gas supply 80. The skilled person would also understand that a single source, such as a tank or canister containing argon, may be used as the inert gas supply 25 and the purge gas supply 80.

The output of the nebulizer 21 is coupled to the spray chamber 22 such that the sample aerosol entrained with the inert gas is provided to an input of the spray chamber 22.

The spray chamber 22 removes large droplets from the sample aerosol and provides the sample aerosol entrained in inert gas to an injector tube 31 of the ICP torch 30 downstream of the spray chamber 22. The large droplets collect and coalesce in the spray chamber leave the sample introduction region via a drain 22a fluidly connected to the spray chamber 22. The spray chamber 22 is coupled to the ICP torch 30 such that the output of the spray chamber 22 is introduced to a first end 30a of the ICP torch 30.

Alternatively, if the sample is a solid, then this is introduced to the ICP torch 30 following laser ablation or spark/arc ablation. In the former method, a pulsed UV laser is focused on the sample and creates a plume of ablated material which can be swept into the ICP torch by use of gas. In the latter an electrical arc/spark is used to ablate material from a sample which is swept in to the ICP torch using a gas.

The ICP torch 30 is employed to create and sustain a plasma 32 formed from an inert gas, such as argon. The plasma 32 is an electrically conducting gaseous mixture containing sufficient cations and electrons to maintain electrical conductance.

The ICP torch 30 comprises three concentric tubes usually made of quartz—a central tube 33, an outer tube 34 and an intermediate tube 35 disposed therebetween. A second end 30b of the torch 30, opposite to the first end 30a, is placed inside an induction coil 36 supplied with a radio-frequency electric current generated by the radio frequency generator 40. The induction coil 36 generates an alternating magnetic field at the second end 30b of the torch 30. The ICP torch 30 is connected to the inert gas supply 25 such that the inert gas flows through the central, outer and intermediate tubes 33, 34, 35 of the ICP torch 30. The flow of inert gas in the outer tube 34 serves two purposes, firstly it is employed to form the plasma 32, and secondarily it is employed to cool the ICP torch 30. The flow of inert gas in the intermediate tube 35 is employed to shift the plasma position within the ICP torch 30. The flow of inert gas in the central tube 33 is employed to transport the sample aerosol to the plasma 32 proximal to the second end 30b of the torch 30.

To generate the plasma 32 within the ICP torch 30, a Tesla coil (not shown) is employed to generate a spark which introduces free electrons. The free electrons are accelerated in alternating directions by the alternating magnetic field created by the induction coil 36. The accelerated electrons collide with atoms of the inert gas and the collisions may cause excitation and ionization of the atoms. The process continues until the rate of release of new electrons in collisions is balanced by the rate of recombination of electrons with ions. This produces the plasma 32, which consists mostly of atoms with a rather small fraction of free electrons and ions.

As mentioned above, the sample aerosol entrained in inert gas enters the central tube 33 at the first end 30a of the torch 30. The sample aerosol is transported to the plasma proximal to the second end of the tube 30b. The plasma comprises a pre-heating zone proximal 32a to the first end of the torch 30a, a normal analytical zone 32b proximal to the second end of the torch 30b and an initial radiation zone 30c disposed therebetween. Once the sample aerosol is within the pre-heating zone 32a, the sample aerosol is desolvated, vaporized and dissociated into atoms. The sample atoms output from the pre-heating zone 32a pass to the initial radiation zone 32c and subsequently to the normal analytical zone 32b. Within these zones, the sample atoms are excited and ionized. It is considered that most of the excitation and ionization occurs as a result of collisions of sample atoms with energetic electrons. Subsequently, the excited and ionized sample atoms exit the plasma 32 and consequently cool. On cooling, the excited and ionized sample atoms electronically relax by emitting photons having wavelengths characteristic of energy levels in the atoms.

The second end 30b of the ICP torch 30 is aligned with the optics 51 of the focusing optics region 50 which are in turn aligned with a wavelength selection device 60. Photons emitted from the normal analytical zone are collected and focused onto an entrance aperture 61 of the wavelength selection device 60 by the optics 51 of the focusing optics of region 50. The entrance aperture 61 of the wavelength selection device 60 may be radially or axially aligned with the plasma 32. The wavelength selection device 60 typically employs a diffraction grating to separate the photons into different wavelengths and may be, for example, a monochromator or polychromator.

The detector 70 is aligned with the wavelength selection device 60 such that photons exiting the wavelength selection device 60 impinge on the detector 70. The detector 70 may be a charge injection device (CID), which is a well-known device and so will not be described in further detail. In an alternative embodiment, the detector may be a charge coupled device (CCD). The output from the detector 70 is measured and processed by a set of electronics 75. The set of electronics 75 may measure the number and wavelengths of the photons to identify and determine a concentration of the elements within the sample. Typically, the detector 70 and the set of electronics 75 are powered by the power supply 10. The output from the set of electronics is provided to a computer 77, which monitors, collects and displays the data of the ICP-OES on a display screen (not shown).

Prior to sample introduction into the ICP-OES 1, the detector 70 must be purged for a start-up time period and subsequently cooled. As discussed above, purging and subsequent cooling of the detector reduces the amount of dark current/noise and so prepares the ICP-OES 1 for introduction and measurement of a sample. The purging and subsequent cooling of the detector is controlled by a protection device 100 comprising a timer 110 and a processor 120. In some embodiments, the processor 120 may be a processor of the computer 77. In the embodiment shown, however, the processor 120 is separate from the computer 77.

For purging of the detector 70, purge gas is applied to the detector 70 via a purge gas supply line 81 connected to the purge gas supply 80. Purge gas is an inert gas such as argon or nitrogen that contains little or no water (around or less than 10 parts per million (ppm) of water). This may be powered by the power supply 10 which is used to power the other components of the ICP-OES 1. The timer 110 is employed to measure a parameter indicative of a shut down time period. The shut down time period is the time period for which purge gas is not applied to the detector. The timer 110 may be, for example, a battery operated timer or a capacitor based timer and more specific details of the operation of the timer will be discussed with reference to later Figures. The processor 120 is connected to the timer 110 and employed to determine a start-up time period based upon the parameter measured by the timer 110. Purge gas is applied to the detector 70 during the start-up period and this may be triggered by the processor 120, or alternatively this may be triggered automatically upon switching on the ICP-OES instrument 1. More specific details of the operation of the processor 120 will be discussed with reference to FIGS. 2, 3 and 4. Preferably, the determined start-up period should be as short as possible, thereby allowing the user to make maximum use of the instrument and consuming less purge gas, whilst being as long as necessary for the detector to be properly purged. Therefore, in a preferred embodiment, the determined start-up period may be the minimum duration of purging for which the detector is properly purged.

Once purged, the cooling device 90, for example a Peltier cooling device, is employed to cool the detector 70 to temperatures below zero degrees Celsius. The processor 120 may be configured to trigger cooling of the detector 70 after elapse of the start-up time period. Once the detector 70 has been purged and cooled, a sample may be introduced to the ICP-OES 1 via the sample introduction region 20.

Figure 2:
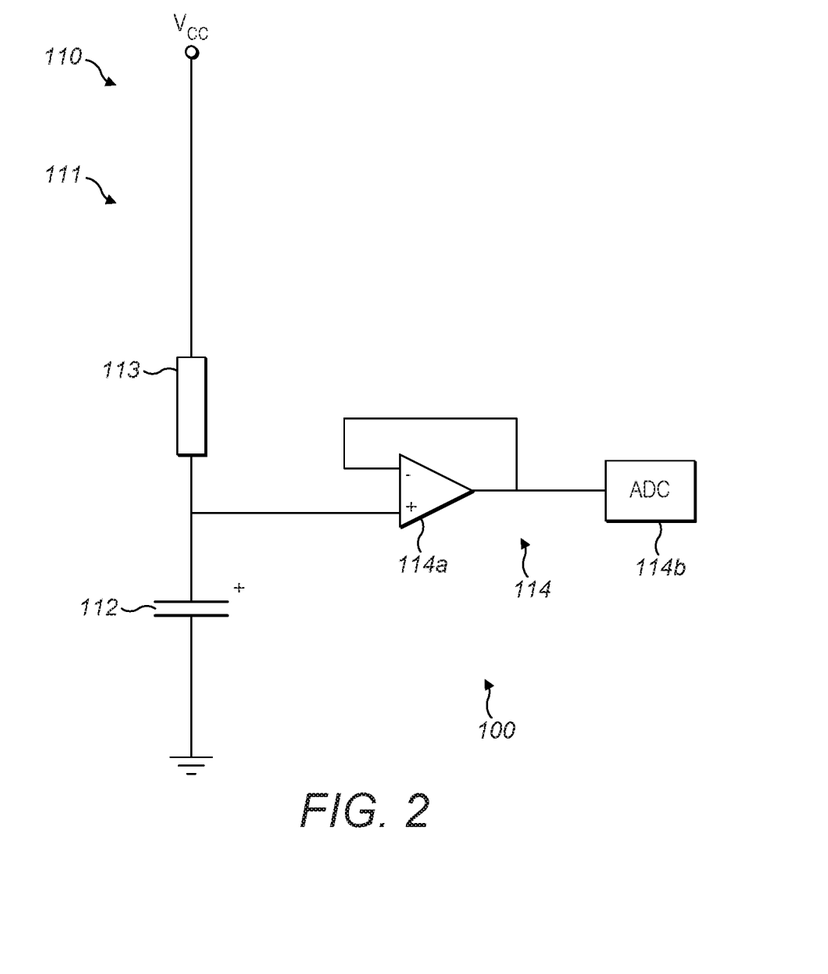
FIG. 2 is a circuit diagram of a preferred embodiment of the timer of FIG. 1.

In a preferred embodiment of the present invention, the timer 110 of FIG. 1 comprises a timing circuit 111 as depicted in FIG. 2. The timing circuit 111 comprises a capacitor 112, a resistor 113 and a voltmeter 114. Preferably, the impendence of the resistor may be 4.7 M Ohm and the capacitance of the capacitor may be 470 μF such that the time constant for the timing circuit may be 36.8 minutes. Preferably, the value for $V_{cc}$ may be 3.3 V. The capacitor 112 and the resistor 113 may be connected in series with the power supply 10 thereby forming an RC circuit connected to ground such that the value for $V_{cc}$ is the voltage across the power supply 10. The capacitor based circuit has advantages over a real-time clock that requires a battery since a battery has a limited lifetime, which is generally much less than the lifetime of the instrument itself. The instrument would therefore need maintenance as the battery would need replacement. In contrast, the circuitry based timer of the present invention, which can be made from low-cost components, is designed to function as intended for the lifetime of the instrument. Furthermore, the degree of time accuracy required of the circuitry based timer is not high so that it is well suited to the described use.

Figure 3:
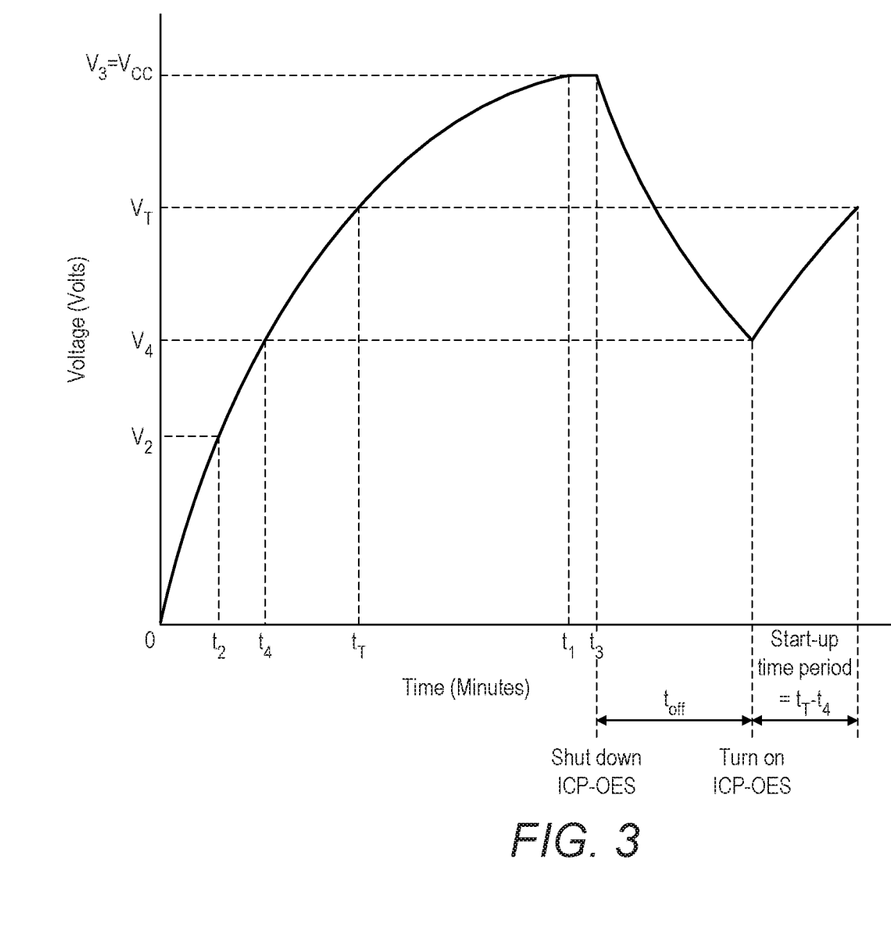
FIG. 3 shows a schematic diagram of a voltage/time plot for the timer of FIG. 2.

On turning on the ICP-OES 1, the capacitor 112 is charged according to equation (1): $V=V_{cc}(1-e^{-t/T})$ wherein V is the voltage across the capacitor 112 at any time t, $V_{cc}$ is the voltage across the power supply 10 and T is the time constant for the timing circuit 111. In a completely discharged state, the voltage across the capacitor 112 is zero and the voltage across the resistor 113 is equal to the voltage of the power supply 10. On turning on the ICP-OES 1, current flows from the power supply 10 to the capacitor 112. The capacitor 102 begins to charge thereby increasing a voltage across the capacitor 112 exponentially with time, as depicted in FIG. 3. Once the capacitor 112 is fully charged, current stops flowing to the capacitor 112, the voltage across the capacitor 112 is approximately equal to the voltage across the power supply 10 ($V_{cc}$) and the voltage across the resistor 113 is approximately zero.

On turning off the ICP-OES 1, the capacitor 112 is discharged according to equation (2): $V=V_{cc}(e^{-t/T})$. During discharge, the voltage across the capacitor 112 drops exponentially with time as current flows away from the capacitor 112 and towards the power supply 10, as depicted in FIG. 3. Once the capacitor 112 is fully discharged, the current stops flowing, the voltage drop across the resistor 103 is approximately equal to $V_{cc}$ and the voltage across the capacitor 112 is zero.

In the circuit of FIG. 2, the voltmeter 114 configured to measure the voltage across the capacitor 102 is a digital voltmeter comprising an operational amplifier 114a connected to an analogue digital converter 114b (ADC). Of course other voltmeters may equally be employed to measure the voltage across the capacitor 112.

The output of the operational amplifier 114a is connected to its inverting input so that the voltage output from the operational amplifier 114a is the same as the voltage input to the voltage amplifier, which is the voltage across the capacitor 112. In other words, the operational amplifier 114a forms a voltage follower (also referred to as a unity-gain amplifier, a buffer amplifier, or an isolation amplifier). The output voltage of the operational amplifier is 114a the same as the voltage across the capacitor 112 and is converted to a digital signal by the ADC 114b. The digital signal is stored and processed by the processor 120 as discussed in further detail in FIG. 4.

Figure 4:
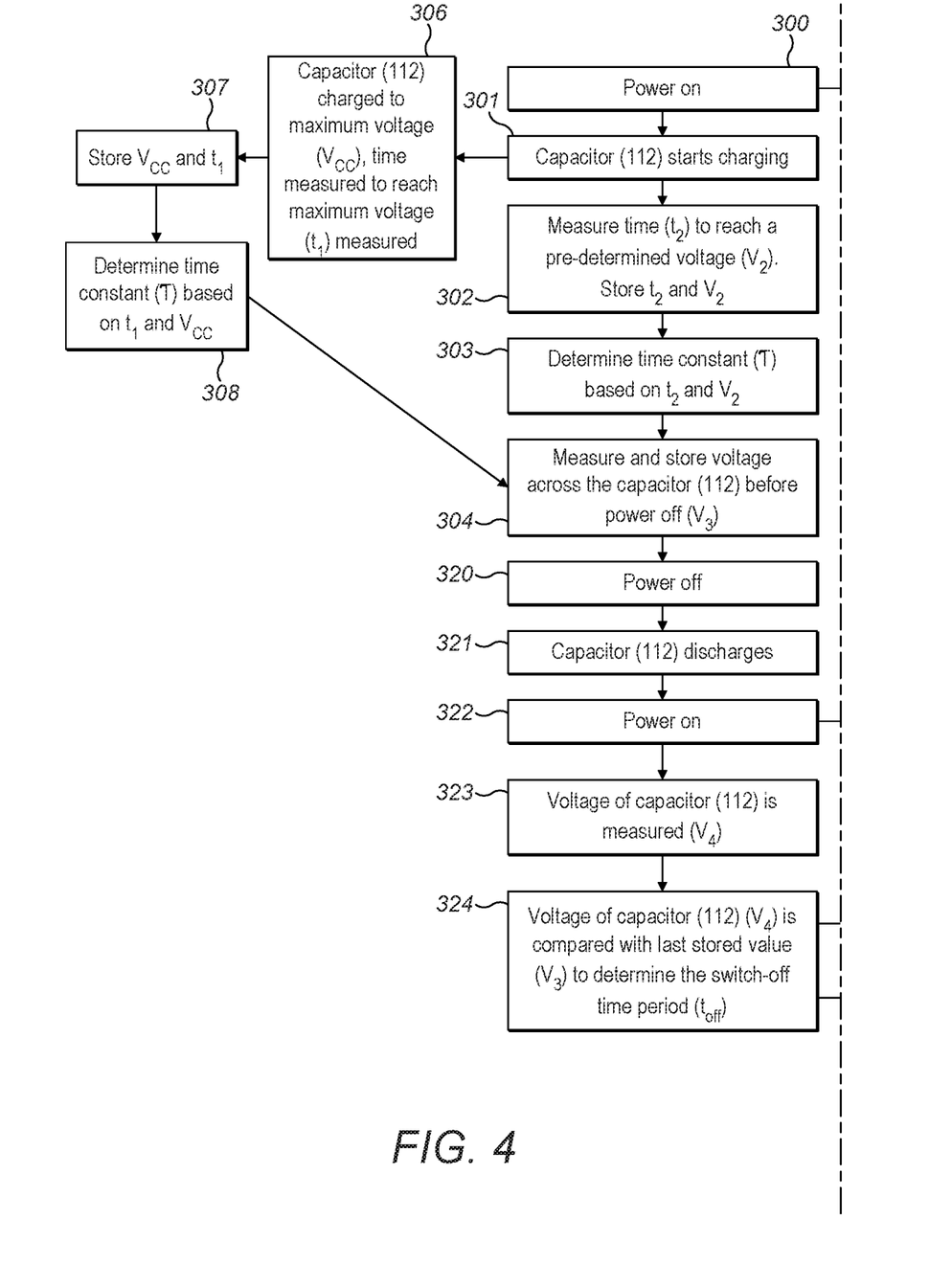
FIG. 4 shows a flowchart illustrating the operation of the timer and the processor of FIG. 2.

The operation of the timer 110 and the processor 120 of the protection device 100 of FIG. 1 is illustrated in FIG. 4. In step 300, the power supply 10 for the ICP-OES 1 is switched on, for example, by a user. In this embodiment, the power supply 10 for the purge gas supply 80 and the timing circuit 111 is the same as that used to power the other components of the ICP-OES 1. Therefore, turning on the ICP-OES 1 triggers turning on of the purge gas supply 80 and charging of the capacitor 112. Of course, as discussed in relation to FIG. 2, the power supply for the purge gas supply 80 and the power supply for the timing circuit 111 may be different from each other and/or from that of the other ICP-OES components. Furthermore, turning on of the timing circuit 111 may be triggered in response to sensing of the application of purge gas to the detector 70.

Once the ICP-OES 1 has been switched on connection of the purge gas supply 80 to the detector 70 is detected in step 310 by using a sensor (not shown). The sensor may be a pressure switch configured to measure the pressure of the purge gas within the supply line 81. If the purge gas supply 80 is not connected to the detector 70, then the processor 120 receives a signal from the pressure switch indicative of a lack of connection. The processor 120 processes this signal and triggers a display screen (not shown) to display a notification to a user to check the connection between the purge gas supply 80 and the detector 70 (step 312). The processor 120 may in addition or by way of alternative process this signal and trigger turning off of the timing circuit 111. The processor 120 also turns off or inhibits turning on of the cooling device 90 thereby preventing cooling of the detector 70 (step 311).

If the purge gas supply 80 is connected to the detector 70, then the processor 120 receives a signal from the pressure switch confirming connection. The processor 120 processes this signal and may trigger a display screen (not shown) to display a notification to a user that the purge gas supply 80 and the detector 70 are connected. The processor 120 may in addition or by way of alternative process this signal and trigger turning on of the timing circuit 111.

Once the ICP-OES 1 has been switched on, the capacitor 112 of the timing circuit 111 starts to charge (i.e. the voltage across the capacitor 112 starts to increase) (step 301) and the application of purge gas to the detector 70 commences, as explained in relation to FIG. 2 and as shown in FIG. 3. In the embodiment of FIG. 1, the power supply 10 is configured to power the components of ICP-OES, the protection device 100 and the application of purge gas 80 to the detector. Therefore, turning on the ICP-OES 1 simultaneously triggers charging of the capacitor 112 and the application of purge gas to the detector 70.

Alternatively, the other components of the ICP-OES 1 may not be powered by the same power supply 10 as that used to power the application of purge gas and used to power the protection device 100. Therefore, turning on the ICP-OES 1 may not cause charging of the capacitor 112 of the timing circuit 111. Instead, turning on the purge gas supply 80 may simultaneously trigger the charging of the capacitor 112 of the timing circuit 111.

In a further alternative embodiment, the power supply for the protection device 100 could be different from that used to power the application of purge gas to the detector 70. A sensor (not shown), which may be the same sensor as that used to check connection of the purge gas supply 80 to the detector 70, may be employed to detect starting and cessation of the application of purge gas to the detector 70. The sensor may generate corresponding control signals that are received by the processor 120 and trigger turning on/off of the timing circuit 111. The sensor may trigger turning on of the timing circuit 111 on starting application of the purge gas to the detector 70 and turning off of the timing circuit 111 on cessation of the application of purge gas to the detector 70. As discussed above, the sensor may be a pressure switch configured to measure the pressure of purge gas within the purge gas supply line 81. In one example, the purge gas supply line 81 may be valve operated and the opening and closing of the valve (not shown) may be sensed by the sensor.

Next, one option is to charge the capacitor 112 to its maximum voltage and measure the time period for the capacitor 112 to reach the maximum voltage ($t_1$) (step 306).

The time period may be measured by the processor 120 using its internal clock as reference. The maximum voltage is approximated to be the voltage of the power supply 10 ($V_{cc}$), which may already be known. Both the maximum voltage ($V_{cc}$) and the corresponding time period ($t_1$) are stored in a memory of the processor 120 (step 307). Subsequently, in step 308, the processor 120 determines the time constant (T) for the timing circuit 111 using equation (1) and the stored maximum voltage ($V_{cc}$) and time for the capacitor 112 to reach the maximum voltage ($t_1$).

Alternatively, once the capacitor 112 has started charging, the time period ($t_2$) for the capacitor to reach a pre-determined voltage ($V_2$) may be measured (step 302). Both the pre-determined voltage ($V_2$) and the corresponding time period ($t_2$) are stored in the memory of the processor 120. Subsequently, in step 303, the pre-determined voltage ($V_2$) and the corresponding time period ($t_2$) are processed to determine the time constant (T) of the timing circuit 111 using equation (1). It is noted that the time constant (T) could be calculated using the known values for impedance of the resistor 113 and capacitance of the capacitor 112. However, measuring the time periods $t_1$ and $t_2$ to determine the time constant (T) of the timing circuit 111 is more accurate, since the value of capacitance may vary over their lifetime and over components by more than 20%.

Typically, the voltage across the capacitor 112 is measured regularly, for example, at intervals of 1 to 30 seconds, preferably at intervals of 1 to 10 seconds, such as every 5 seconds. The last stored value of the voltage before shut down is measured as $V_3$, as indicated in FIG. 3 and step 304 of FIG. 4.

Once the power supply 10 has been switched off, and so the ICP-OES 1 has been shut down, (step 320), the application of purge gas to the detector 70 stops and the voltage across the capacitor 112 decreases as the capacitor 112 discharges (step 321). This is discussed in relation to FIG. 2 and is depicted in FIG. 3.

Subsequently, the power supply 10 is switched on again and so the application of purge gas to the detector 70 restarts (step 322). The voltage across the capacitor 112 on switching on the power supply 10, the restart voltage ($V_4$), is measured (step 323), as depicted in FIG. 3. The restart voltage ($V_4$) is stored and processed by the processor 120.

In step 324, the processor compares the restart voltage ($V_4$) with the last stored value, $V_3$, which may be equal to $V_{CC}$ if the capacitor was fully charged before shut down.

If the capacitor was not fully charged before shut down, then the processor 120 determines the time period for which the purge gas supply 80 has been switched off using equation (2) with $V_3$, $V_4$ and the time constant (T) previously determined in step 303. In more detail, the processor inputs the restart voltage ($V_4$) and the time constant (T) into equation (2) to determine the time for the voltage across the capacitor 112 to drop from the maximum voltage ($V_{cc}$) to the restart voltage ($V_4$). The processor then inputs $V_3$ into equation (2) to determine the time for the voltage across the capacitor to drop from $V_{cc}$ to $V_3$. The processor then subtracts these values from each other to determine the shut down time period ($t_{off}$) (the time for which the ICP-OES 1, and so the purge gas supply 80, is switched off).

Typically, the capacitor has become fully charged prior to shut down. Consequently, the restart voltage ($V_4$) may be input into equation (2) and the time period for which the ICP-OES 1 is switched off is equal to the time for the voltage across the capacitor to drop from maximum voltage ($V_{cc}$) to the restart voltage ($V_4$).

Note that the impedance of all other loads is much smaller than the value of the resistor which leads to the approximation that the $V_{cc}$ net is connected to ground during power-down.

In steps 340, 350 and 360, the processor compares the shut down time period ($t_{off}$) for which the ICP-OES 1 was switched off to first and second threshold time values ($t_a$) and ($t_b$). The first threshold time period ($t_a$) is less than the second threshold time period ($t_b$). The first threshold time period ($t_a$) may be, for example, 15 minutes. The second threshold time period may be, for example, 30 minutes. The first and second threshold time periods ($t_a$, $t_b$) may be experimentally determined. The first and second threshold time periods ($t_a$, $t_b$) may also be stored in a memory of the processor 120.

If the shut down time period ($t_{off}$) is less than the first threshold time value ($t_a$), then no further application of purge gas to the detector 70 prior to cooling is required (step 341). Subsequently, the processor 120 generates a trigger signal that triggers cooling of the detector (step 342), for example, by triggering switching on of the cooling device 90.

The first threshold time value ($t_a$) is the maximum time period for which the application of purge gas may be turned off before cooling of the detector 70 safely. If the application of purge gas is turned off for a time period greater than the first threshold time value ($t_a$), then cooling of the detector may result in damage or reduced performance.

If the shut down time period ($t_{off}$) is greater than the first threshold time value ($t_a$), then the processor 120 triggers turning off or inhibits turning on of the cooling device 90 (steps 351, 361).

The processor then calculates the start-up time period ($t_{start}$), which is the time period for which purge gas is applied to the detector 70 (steps 352, 362).

The start-up time period ($t_{start}$) may be selected by the processor 120 from a number of pre-determined time periods which are pre-determined experimentally using a safety factor. The start-up time period ($t_{start}$) is selected from the pre-determined time periods based upon the shut down time period ($t_{off}$). The selection may also be based upon the performance quality desired by the user. For example, for a certain shut-down time period ($t_{off}$), there may be two possible pre-determined time periods for the start-up time period ($t_{start}$). If the user desires a high performance measurement, then the longer of those pre-determined time periods may be selected as the start-up time period ($t_{start}$).

Alternatively, the start-up time period ($t_{start}$) may be calculated. The calculation of the start-up time period ($t_{start}$) is based upon the value of the voltage on start-up ($V_4$) using equation (1). The processor 120 determines the time for the capacitor 112 to charge up to a threshold voltage value ($V_T$) from the restart voltage ($V_4$). The threshold voltage value ($V_T$) is set based upon the voltage across the capacitor once the capacitor has been charged for a time period sufficiently long enough for a proper purge to occur. A proper purge is a purge for a certain period of time so that the atmosphere surrounding the detector is sufficiently water vapour free and subsequent cooling of the detector will not cause damage to it and/or reduce f its performance. By way of example, the threshold voltage value may be the voltage which the capacitor has after a charging time of 30 minutes. The processor 120 determines this by calculating the time ($t_T$) for the capacitor to charge from zero volts to the threshold voltage value ($V_T$) using equation 1. The processor 120 then determine the time ($t_4$) for the capacitor to charge from zero volts to the restart voltage ($V_4$). The processor then subtracts $t_4$ from $t_T$ thereby determining the start-up time period ($t_{start}$).

If the shut down time period ($t_{off}$) is greater than the first threshold time value ($t_a$) but less than the second threshold time value ($t_b$), then once the start-up time period ($t_{start}$) has been determined (step 350), the processor 120 triggers the display screen (not shown) to display a notification to a user (step 353). The notification indicates that the detector 70 should be purged for the start-up time period ($t_{start}$) for optimal performance. The notification also indicates that the user can choose to take reduced performance measurements before the detector 70 is ready (i.e. without further purging of the detector 70 and without cooling of the detector 70).

Subsequently, the processor 120 generates a signal to restart or maintain application of purge gas to the detector 70 for the start-up time period ($t_{start}$) (step 354). For example, the processor 120 may control switching on and off of the purge gas supply 80 or may control valve operation of the purge gas supply line 81. Once the detector 70 has been purged for the start-up time period ($t_{start}$), the processor 120 triggers cooling of the detector (step 355). For example, the processor 120 may trigger switching on of the cooling device 90 once the start-up time period ($t_{start}$) has elapsed.

If the shut down time period ($t_{off}$) is greater than the second threshold time value ($t_b$) (step 360), then once the start-up time period ($t_{start}$) has been determined (step 362), the processor 120 triggers the display screen (not shown) to display a notification to a user (step 363). This notification indicates that measurements should not be taken before purging of the detector 70 for the start-up time period ($t_{start}$). Therefore, in this case, a user does not have the option of taking reduced performance measurements before the detector 70 is ready. Subsequently, the processor 120 generates a signal to restart or maintain application of purge gas to the detector 70 for the start-up time period ($t_{start}$) (step 364). For example, the processor 120 may control switching on and off of the purge gas supply 80 or may control valve operate of the purge gas supply line 81. Once the detector 70 has been purged for the start-up time period ($t_{start}$), the processor 120 triggers cooling of the detector (step 365). For example, the processor 120 may trigger switching on of the cooling device 90 once the start-up time period ($t_{start}$) has elapsed.

Figure 5:
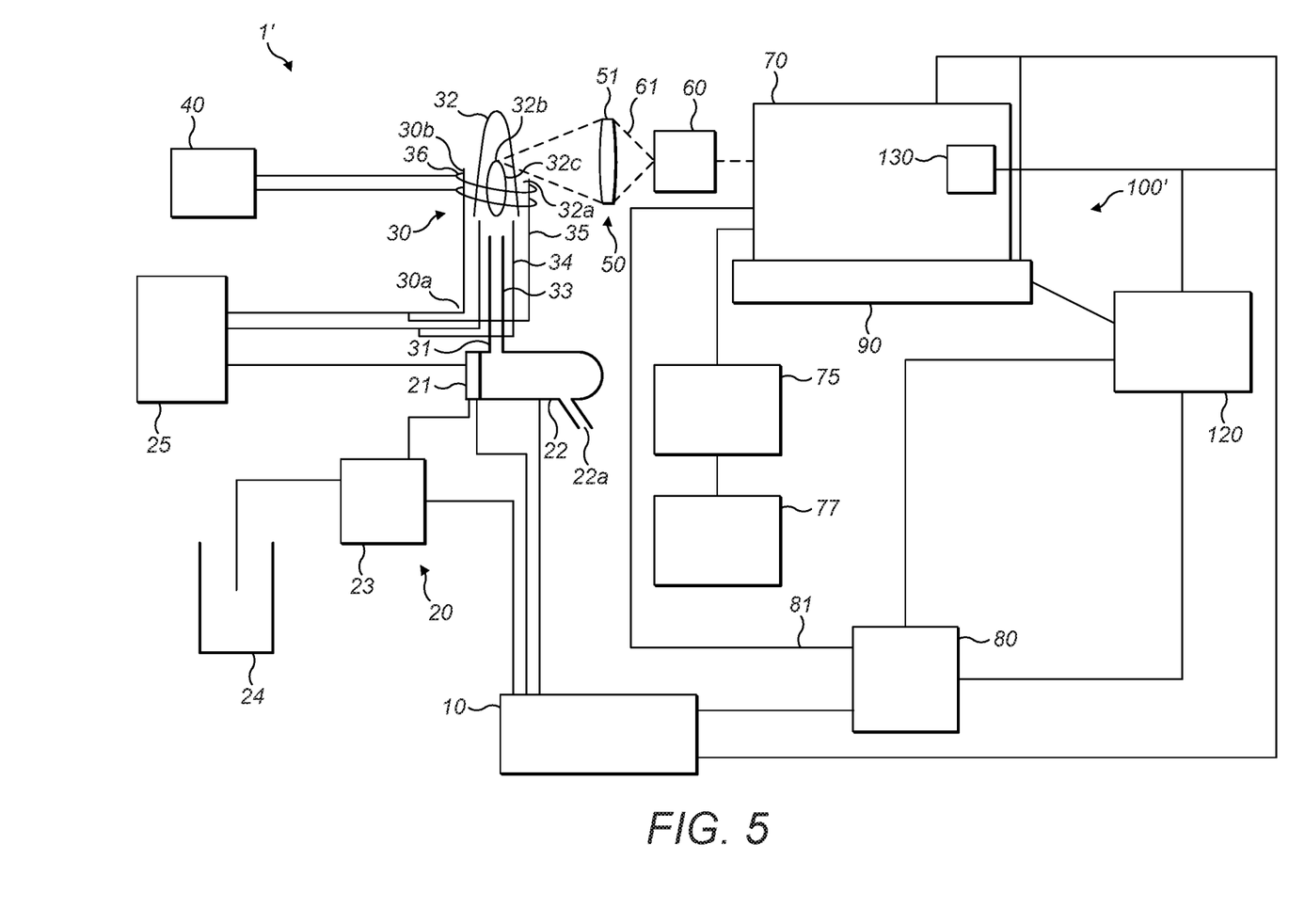
FIG. 5 is a schematic diagram of a second embodiment of an inductively coupled plasma optical emission spectrometer (ICP-OES) with a humidity sensor and a processor in accordance with the present invention.

FIG. 5 is a schematic diagram of a second embodiment of an ICP-OES 1' in accordance with the present invention. The arrangement of FIG. 5 is essentially the same to that of FIG. 1 and so will not be described in detail to avoid repetition. The difference between the arrangement of FIG. 1 and of FIG. 4 is that, in FIG. 5, the protection device 100' comprises a humidity sensor 130 instead of a timer. The humidity sensor 130 is located within a region of the detector 70 where cooling takes place. However, the humidity sensor 130 could instead be located within the purge gas supply line 81. The humidity sensor 130 is connected to the processor 120 and is employed to measure a parameter indicative of moisture content in the detector 70 following cessation of the application of purge gas to the detector 70. The humidity sensor 130 employs an electronic hygrometer that measures the capacitance of its environment, which relates directly to relative humidity. Although the absolute capacitance may vary from sensor to sensor, individual sensors should be very repeatable. This type of hygrometer comprises capacitor having a dielectric material placed between two electrically conductive plates. The dielectric material is configured to absorb water vapour from its environment. The electrical capacitance across the capacitor increases as the dielectric material absorbs water vapour. The humidity sensor 130 may be calibrated by performing a two point calibration. The calibration data may be stored within the sensor. For example, the humidity sensor may be a camera and the calibration data may be stored within the flash of the camera. The humidity sensor 130 may alternatively employ, for example, dry and wet bulb hygrometers or dew point hygrometers. The processor 120 is employed to determine the start-up time period based upon the parameter indicative of moisture content. The humidity sensor 130 and the processor 120 are described in more detail in FIG. 6.

Figure 6:
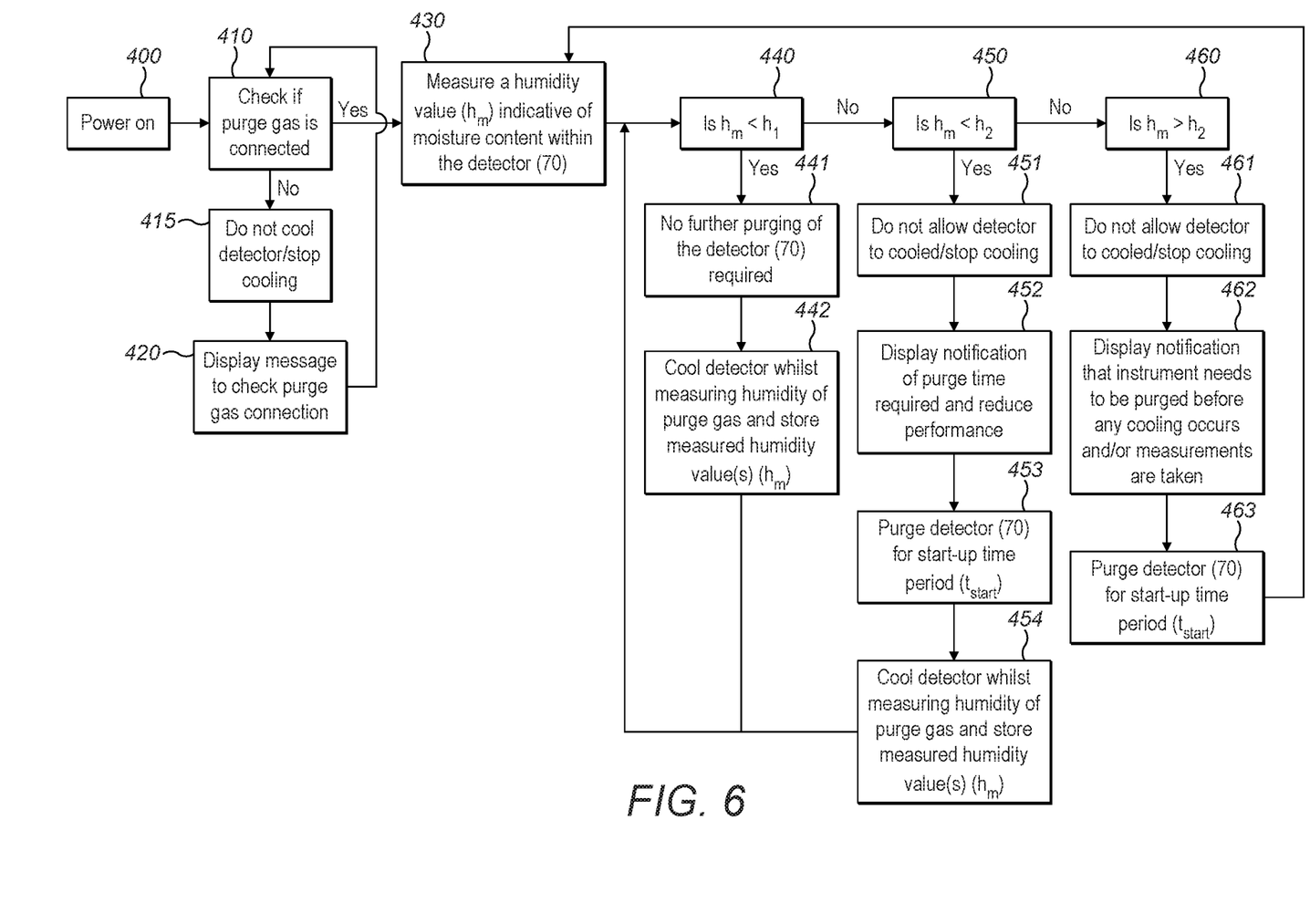
FIG. 6 shows a flowchart illustrating the operation of the humidity sensor and the processor of FIG. 5.

In step 400, the power supply for the ICP-OES 1' is turned on, for example, manually by a user. In this embodiment, the power supply powering the application of purge gas to the detector 70 is the same as that powering the other components of the ICP-OES 1'. Therefore, turning on the ICP-OES 1' triggers the application of purge gas to the detector 70. Of course, the power supply for the purge gas supply may be different from that of the other ICP-OES components.

Once the ICP-OES 1' has been switched on, a sensor (not shown) detects connection of the purge gas supply 80 to the detector 70 in step 410. The sensor may be a pressure switch configured to measure the pressure of the purge gas within the supply line 81. If the purge gas supply 80 is not connected to the detector 70, then the processor 120 receives a signal from the pressure switch indicative of lack of connection, processes this signal and triggers the display screen (not shown) to display a notification to a user to check the purge gas connection (step 420). The processor 120 also turns off or inhibits turning on of the cooling device 90 thereby preventing cooling of the detector 70 (step 415).

If the purge gas supply 80 is connected to the detector, then the processor 120 receives a signal from the sensor confirming connection. Subsequently, the processor 120 processes this signal and triggers the humidity sensor 130 to measure a humidity value ($h_m$) indicative of moisture content within the detector 70 (step 430). The measured humidity value ($h_m$) is stored in the memory of the processor 120.

Subsequently, in steps 440, 450 and 460, the processor compares the measured humidity value ($h_m$) to a first threshold humidity value ($h_1$) and a second threshold humidity value ($h_2$). The first threshold humidity value ($h_1$) is less than the second threshold humidity value ($h_2$). The first and second threshold humidity values ($h_1$, $h_2$) may be experimentally determined. The first and second threshold humidity values ($h_1$, $h_2$) may also be stored in a memory of the processor 120.

Typically, the first threshold humidity value ($h_1$) is a maximum level of humidity of a detector which may be cooled safely. If the measured humidity value ($h_m$) is less than the first threshold humidity value ($h_1$), then no further purging of the detector 70 is required before cooling (step 441). Subsequently, the processor 120 triggers cooling of the detector 70, for example, by triggering turning on of the cooling device 90 (step 442).

If the measured humidity value ($h_m$) is greater than the first threshold humidity value ($h_1$), then the processor 120 triggers turning off or inhibits turning on of the cooling device 90 (steps 451, 461). The processor then calculates the start-up time period ($t_{start}$), which is the time period for which purge gas is applied to the detector 70.

The start-up time period ($t_{start}$) may be selected by the processor 120 from a number of pre-determined time periods which are pre-determined experimentally using a safety factor. The start-up time period ($t_{start}$) is selected from the pre-determined time periods based upon the humidity value ($h_m$). The pre-determined time periods may be stored in a memory of the processor 120. The selection may also be based upon the performance quality desired by the user. For example, for a certain humidity value ($h_m$), there may be two possible pre-determined time periods. If the user desires a high performance measurement, then the longer of those pre-determined time periods may be selected as the start-up time period ($t_{start}$).

If the measured humidity value ($h_m$) is less than the second threshold humidity value ($h_2$) but greater than the first threshold humidity value ($h_1$) (step 450), then the processor 120 triggers the display screen (not shown) to display a notification to a user (step 452). The notification indicates that for optimal performance the detector 70 should be purged for the start-up time period ($t_{start}$). The notification also indicates that the user can choose to take reduced performance measurements before the detector 70 is ready (i.e. without further purging of the detector 70 and without cooling of the detector 70). Subsequently, the processor 120 triggers purging of the detector 70 for the start-up time period ($t_{start}$) for example 30 minutes (step 453). For example, the processor 120 may control turning on/off of the purge gas supply 80 or valve operation of the purge gas supply line 81. Subsequently, the processor 120 triggers cooling of the detector 70, for example, by triggering turning on of the cooling device 90 (step 454).

If the measured humidity value ($h_m$) is greater than the second threshold humidity value ($h_2$) (step 460), then the processor 120 triggers the display screen (not shown) to display a notification to a user (step 461). This notification indicates that the detector 70 should be purged for the start-up time period ($t_{start}$) before any cooling occurs and/or measurements are taken. Therefore, in this case, a user does not have the option of taking reduced performance measurements before the detector 70 is ready. The start-up time period ($t_{start}$) for $h_m > h_2$ is greater than the start-up time period for $h_m < h_2$.

Subsequently, the processor 120 triggers purging of the detector 70 for the start-up time period ($t_{start}$). The processor 120 does not trigger cooling of the detector 70 in this instance. Instead, following purging of the detector, the humidity of the purge gas is measured again. If, when re-measured, the measured humidity value ($h_m$) is less than the first threshold humidity value ($h_1$), then the processor 120 triggers cooling of the detector 70 (step 442). If, when re-measured, the humidity of the purge gas ($h_m$) is greater than the first threshold humidity value ($h_1$) but less than the second threshold humidity value ($h_2$), then the detector 70 may be cooled once purged for the start-up time period ($t_{start}$), as discussed above. Therefore, the protection device 100 ensures that the detector 70 is not cooled until a safe level of humidity has been reached.

As depicted in steps 442, 454 and 463 during cooling of the detector 70, the humidity of the purge gas is measured, for example, every ten minutes. The measured humidity values ($h_m$) are stored in the memory of the processor 120. The processor 120 compares the measured humidity values ($h_m$) to the first and second threshold humidity values ($h_1$, $h_2$) (steps 440, 450, 460). If a measured humidity value ($h_m$) is less than the first threshold humidity value ($h_1$), then cooling of the detector 70 may be continued. If a measured humidity value ($h_m$) is greater than the first threshold humidity value ($h_1$), then the processor 120 causes cooling of the detector 70 to stop (steps 451, 461). By way of example, the processor 120 may trigger turning off of the cooling device 90, in response to the measured humidity value ($h_m$) being greater than the first threshold humidity value ($h_1$). The processor may then trigger purging of the detector 70 for the start-up time period ($t_{start}$). The duration of the start-up time period ($t_{start}$) depends upon whether the humidity of the purge gas is less than or greater than the second threshold humidity value ($h_2$). Therefore, the protection device 100 dynamically controls purging and cooling of the detector 70 to ensure that damage to the detector 70 is avoided.

Figure 7:
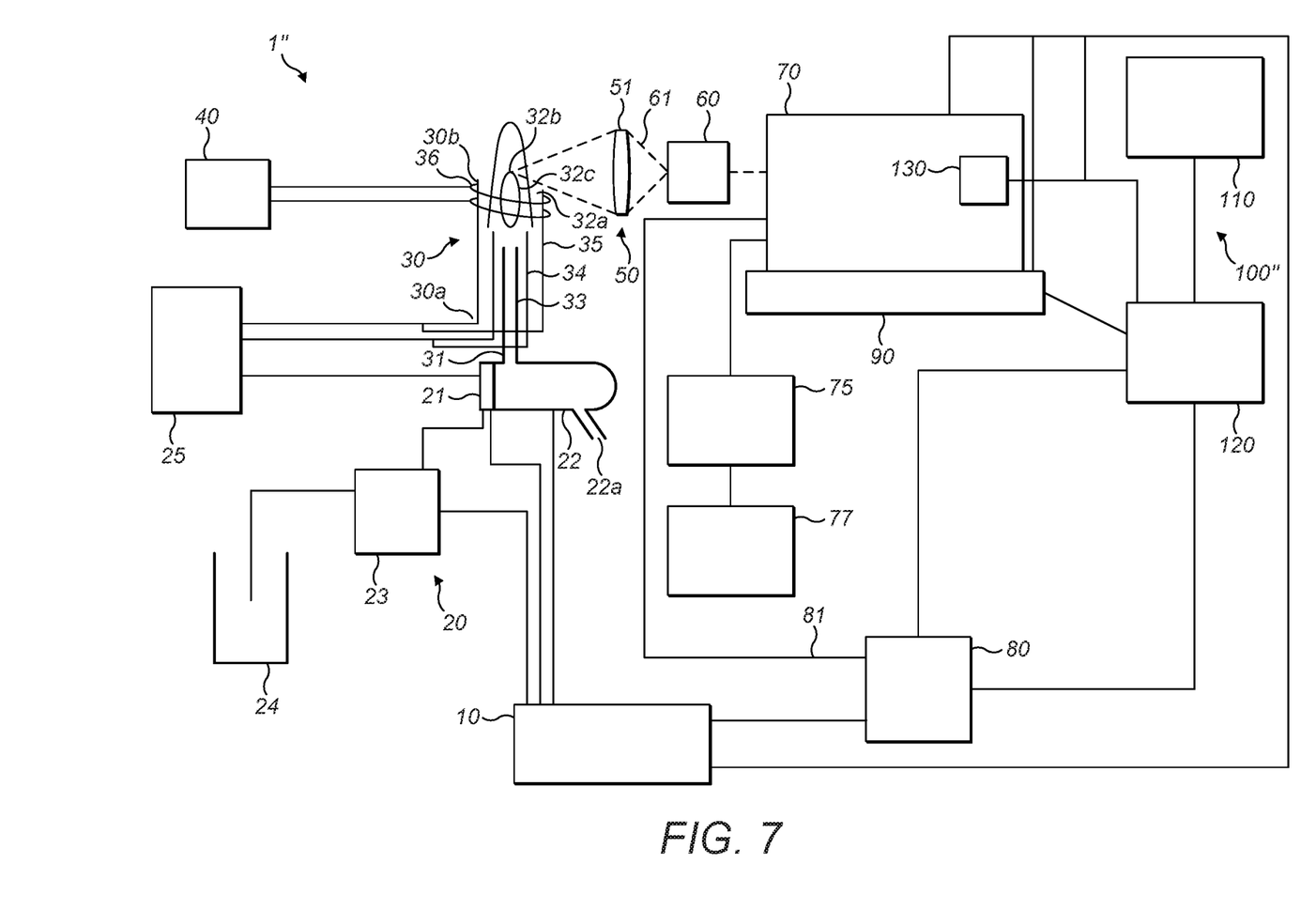
FIG. 7 is a schematic diagram of a third embodiment of an inductively coupled plasma optical emission spectrometer (ICP-OES) having a timer, a humidity sensor and a processor in accordance with the present invention.

FIG. 7 is a schematic diagram of a third embodiment of an ICP-OES 1" in accordance with the present invention. The arrangement of FIG. 7 is essentially the same to that of FIG. 1 and FIG. 5 except that the protection device 100" comprises both the timer 110 of FIGS. 1 to 4 and the humidity sensor 130 of FIGS. 5 and 6. The timer 110 and the humidity sensor 130 are connected to the processor 120. The timer 110 is employed to measure a parameter indicative of the shut down time period following cessation of an application of purge gas to the detector 70. The shut down time period, as discussed above, is the time period for which purge gas is not applied to the detector 70. Specific details of the timer 110 operation have been discussed in relation to FIGS. 2 and 3. The processor 120 is employed to determine the start-up time period based upon the shut-down time period. During the start-up time period, purge gas is applied to the detector 70 based upon the parameter. The processor 120 may be configured to trigger application of purge gas to the detector 70 or maintain application of purge gas to the detector 70 during the start-up time period, preferably from the beginning of the start-up period. The humidity sensor 130 is employed to measure a parameter indicative of moisture content in the detector 70 following cessation of the application of purge gas to the detector 70 and/or following purging of the detector 70 for the start-up time period.

It can be seen that the timer 110 can be used alone as shown in FIG. 1 as a means to determine the shut-down period, or it can be used as a back-up to a humidity sensor (or pressure or other sensor) as shown in FIG. 7, which can be useful if the humidity sensor (or pressure sensor etc.) should fail. Alternatively, the humidity sensor (or pressure or other sensor) may be used as a back-up to the timer 110 as a means to determine the shut-down time period.

Alternatively, the timer 110 and humidity sensor 130 may be used simultaneously in the embodiment of FIG. 7. For instance, the processor 120 may process signals/measurements received from both the timer 110 and the humidity sensor 130. If either measurement indicate that the detector 70 should be purged before cooling, then the processor 120 will trigger purging of the detector 70. The processor 120 will also prevent cooling of the detector 70 until both the measurement/signal received from the timer 110 and the measurement/signal received from the humidity sensor 130 indicate that cooling of the detector 70 may be performed safely.

For example, the timer 110 may be used to determine the start-up time period ($t_{start}$) and the humidity sensor 130 may be used to measure the humidity value ($h_m$) after purging the detector for the start-up time period ($t_{start}$). The measured humidity value ($h_m$) may then be compared to the first threshold humidity value ($h_1$). If the measured humidity value ($h_m$) is less than the first threshold humidity value ($h_1$), then the processor 120 may trigger cooling of the detector 70. If the measured humidity value ($h_m$) is greater than the first threshold humidity value ($h_1$), then the processor 120 may prevent cooling of the detector 70 and instead trigger further purging of the detector 70.

Alternatively, the start-up time period ($t_{start}$) determined using the humidity sensor 130 and the timer 110 each may be compared and averaged. In this case, the humidity sensor 130 is employed to measure a parameter indicative of moisture content in the detector 70 following cessation of the application of purge gas to the detector 70. Once an averaged start-up time period has been determined, the methodology in FIG. 4 or FIG. 6 may be followed.

The embodiments of the present invention relate to an ICP-OES. However, it will be understood that the present invention is applicable to various types of spectrometer implementing a detector that is cooled to optimize performance. For example, the invention may be applied to other types of optical emission spectrometer (OES) such as a Spark Ablation OES, a Microwave Induced Plasma (MIP) OES, or the like.

The skilled person would readily appreciate that the power supply used to power the components of the ICP-OES, to power the application of purge gas to the detector and to power the timer and processor may be the same or alternatively, each of these elements may have a separate power supply. For example, the timer may be battery operated.

The skilled person would also understand that, whilst the processor and timer have been described as separate features, they could, of course, be arranged to form a single unit.

Of course, whilst the sensor employed in the ICP-OES of FIGS. 5 to 8 is a humidity sensor, other sensors may be alternatively or additionally employed to indicate a characteristic of the atmosphere in the detector and therefrom the shut down time period. For example, a pressure sensor may be employed in the detector 70 or the purge gas supply line 81 and pressure of the purge gas may be measured to indicate the shut-down period. In one such embodiment, the amount that the pressure is below a threshold pressure (or below the last measured pressure before shut down) can indicate the shutdown time period ($t_{off}$). Subsequently, after the purge gas is supplied again to the detector, when the pressure has reached a certain threshold, and optionally maintained at that level for a certain time, it can be determined that the detector is properly purged so that the detector may be cooled. Alternatively, the application of purge gas to the detector 70 may be controlled by a solenoid valve and operation of the solenoid valve may be monitored to indicate the shut down time period.

Moreover, whilst the processor has been described to trigger turning on and off of the purge gas supply 80 and cooling device 90, the skilled person would appreciate that the processor may instead generate a visual or audio alert to a user indicating when each of the purge gas supply 80 and cooling device 90 should be turned on and off. Therefore, the purge gas supply 80 and cooling device 90 may be turned on and off manually.

The invention claimed is:

1. A protection device for an Optical Emission Spectrometer (OES) having a detector configured to have gas supplied, the protection device comprising:
    a timer configured to measure a parameter indicative of a shut down time period following cessation of an application of purge gas to the detector; and
    a processor connected to the timer, wherein the processor is configured to determine a start-up time period, during which purge gas is supplied to the detector prior to cooling of the detector, the start-up time period being based upon the parameter measured by the timer.

2. The protection device of claim 1, wherein:
    the processor is configured to generate a first trigger signal to commence application of purge gas to the detector during the start-up time period.

3. The protection device of claim 1, wherein:
the processor is configured to generate a second trigger signal to commence cooling of the detector after elapse of the start-up time period.

4. The protection device of claim 1, wherein the processor is configured to determine the start-up time period based upon a comparison of the parameter measured by the timer to a threshold value.

5. The protection device of claim 1, wherein the processor is configured to commence the start-up time period immediately upon restarting the application of purge gas to the detector.

6. The protection device of claim 1, wherein:
the timer is configured to receive a first signal indicative of cessation of the application of purge gas to the detector and to start a timing operation in response to receipt of the first signal;
the timer is configured to receive a second signal indicative of restarting of the application of purge gas to the detector and to end the timing operation in response to receipt of the second signal; and
the processor is configured to determine the start-up time period based upon a duration of the timing operation measured by the timer.

7. The protection device of claim 1 further comprising a sensor configured to sense commencing and stopping of the application of purge gas to the detector and to generate a first signal in response to commencing of the application of purge gas to the detector and to generate a second signal in response to the cessation of the application of purge gas to the detector; wherein:
the timer includes a timer circuit comprising a capacitor, a resistor, a voltmeter and a switch;
the switch is configured to close in response to receipt of the first signal from the sensor;
the switch is configured to open in response to receipt of the second signal from the sensor;
the switch is connected in series with the capacitor and the resistor such that closing the switch causes the capacitor to be charged and opening the switch causes the capacitor to be discharged;
the voltmeter is configured to measure a voltage across the capacitor upon restarting the application of purge gas to the detector; and
the processor is configured to determine the start-up time period based upon the voltage measured across the capacitor upon restarting the application of purge gas to the detector.

8. The protection device of claim 1, wherein:
the timer includes a timer circuit comprising a capacitor, a resistor, a voltmeter and a switch;
the switch is configured such that closing of the switch triggers commencing the application of purge gas to the detector and opening of the switch triggers stopping the application of purge gas to the detector;
the switch is connected in series with the capacitor and resistor such that closing the switch causes the capacitor to be charged and opening the switch causes the capacitor to be discharged;
the voltmeter is configured to measure a voltage across the capacitor upon restarting of the application of purge gas to the detector; and
the processor is configured to determine the start-up time period based upon the voltage measured across the capacitor upon restarting the application of purge gas to the detector.

9. The protection device of claim 8, wherein:
the voltmeter is configured to measure a voltage across the capacitor upon cessation of the application of purge gas to the detector; and
the processor is configured to determine the start-up time period based upon the voltage measured across the capacitor upon restarting the application of purge gas to the detector and the voltage across the capacitor upon cessation of the application of purge gas to the detector.

10. The protection device of claim 8, wherein:
the voltmeter is configured to measure a maximum voltage across the capacitor before cessation of the application of the purge gas to the detector; and
the processor is configured to determine a second time period based upon comparing the maximum voltage across the capacitor before cessation of the application of the purge gas to the detector and the voltage across the capacitor upon restarting application of purge gas to the detector.

11. The protection device of claim 1, further comprising:
a humidity sensor, wherein the humidity sensor is configured to measure a humidity value indicative of moisture content within or adjacent to the detector.

12. The protection device of claim 11, wherein:
the humidity sensor is configured to measure a humidity value indicative of moisture content within the detector at the end of the start-up time period; and
the processor is configured to compare the measured humidity value to a threshold humidity value and
(a) to generate a signal to restart or maintain application of purge gas to the detector if the humidity value is above the threshold humidity value without cooling the detector; and
(b) to generate a second trigger signal to commence cooling of the detector if the humidity value is below the threshold humidity value.

* * * * *

UNITED STATES PATENT AND TRADEMARK OFFICE
CERTIFICATE OF CORRECTION

Page 1 of 1

PATENT NO. : 11,002,600 B2
APPLICATION NO. : 16/154168
DATED : May 11, 2021
INVENTOR(S) : Eike Jasper et al.

It is certified that error appears in the above-identified patent and that said Letters Patent is hereby corrected as shown below:

On the Title Page

Item (54) and in the Specification Column 1, Line 2, replace "Speedometer" with -- Spectrometer --.

In the Claims

Claim 1, Column 14, Line 54, delete "to have gas" and insert -- to have purge gas --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*